United States Patent [19]
McHann, Jr.

[11] Patent Number: 5,991,806
[45] Date of Patent: Nov. 23, 1999

[54] DYNAMIC SYSTEM CONTROL VIA MESSAGING IN A NETWORK MANAGEMENT SYSTEM

[75] Inventor: Stanley E. McHann, Jr., Gilroy, Calif.

[73] Assignee: Dell USA, L.P., Round Rock, Tex.

[21] Appl. No.: 08/871,467

[22] Filed: Jun. 9, 1997

[51] Int. Cl.$^6$ .......................... G06F 15/16; G06F 15/177
[52] U.S. Cl. ........................... 709/224; 709/238
[58] Field of Search ................. 395/200.53, 200.54, 395/750, 674, 672; 709/223, 224, 238, 250, 104, 100

[56] References Cited

U.S. PATENT DOCUMENTS

| | | | |
|---|---|---|---|
| 4,754,273 | 6/1988 | Okada | 340/825.2 |
| 4,812,839 | 3/1989 | Okada | 340/825.14 |
| 4,896,277 | 1/1990 | Vercellotti et al. | 364/551.01 |
| 5,051,720 | 9/1991 | Kittirutsunetorn | 340/310 |
| 5,404,544 | 4/1995 | Crayford | 395/750 |
| 5,471,617 | 11/1995 | Farrand et al. | 395/700 |
| 5,537,099 | 7/1996 | Liang | 340/825.07 |
| 5,560,022 | 9/1996 | Dunstan et al. | 395/750 |
| 5,652,893 | 7/1997 | Ben-Meir et al. | 395/750 |
| 5,742,833 | 4/1998 | Dea | 395/750.05 |
| 5,774,669 | 6/1998 | George et al. | 395/200.54 |
| 5,787,252 | 7/1998 | Schettler et al. | 395/200.54 |
| 5,790,793 | 8/1998 | Higley | 395/200.48 |
| 5,802,146 | 9/1998 | Dulman | 379/34 |
| 5,867,495 | 2/1999 | Elliott et al. | 370/352 |

OTHER PUBLICATIONS

Intel/Microsoft/Toshiba—"Advanced Configuration and Power Interface Specification", Revision 1.0, Dec. 22, 1996, Chapter 3, pp. 17–33.

Telecommunication System Engineering—Third Edition: Wiley Series in Telecommunications and Signal Processing, by Roger L. Freeman, published by John Wiley & Sons, Inc. Chapter 18, "Network Management Systems", pp. 961–969.

*Primary Examiner*—Mehmet B. Geckil
*Attorney, Agent, or Firm*—Skjerven, Morrill, MacPherson, Franklin & Friel LLP; Ken J. Koestner

[57] ABSTRACT

A transactional event management structure is implemented in a network computer system. A dynamic system controller resolves proprietary and standard event and message structures into a common format for use by a system for many management purposes. A dynamic system controller in a computer is connected with a plurality of subsystems in the computer for receiving messages from the subsystems, analyzing the messages and determine an effective utilization of the messages as directed by a user or network administrator. The dynamic system controller receives messages in different message formats, organizes the messages, and converts the messages into a common format that assists a user, system administrator, or network administrator in utilizing the information contained in the messages. The converted messages in a common format are distributed at the discretion of a user, network administrator, or system administrator based on user needs or message importance to other system administration applications via a selected communication method. The network administrator controls the type of messages that are communicated over the network. A dynamic system controller supports the conversion of messages into the common format to facilitate particular control applications. In one example, the conversion of message to a common format facilitates sophisticated power management operations. The power management operations facilitated by the conversion of messages to a common format enable portable and laptop computers to manage power consumption based on user demand rather than system timing.

38 Claims, 13 Drawing Sheets

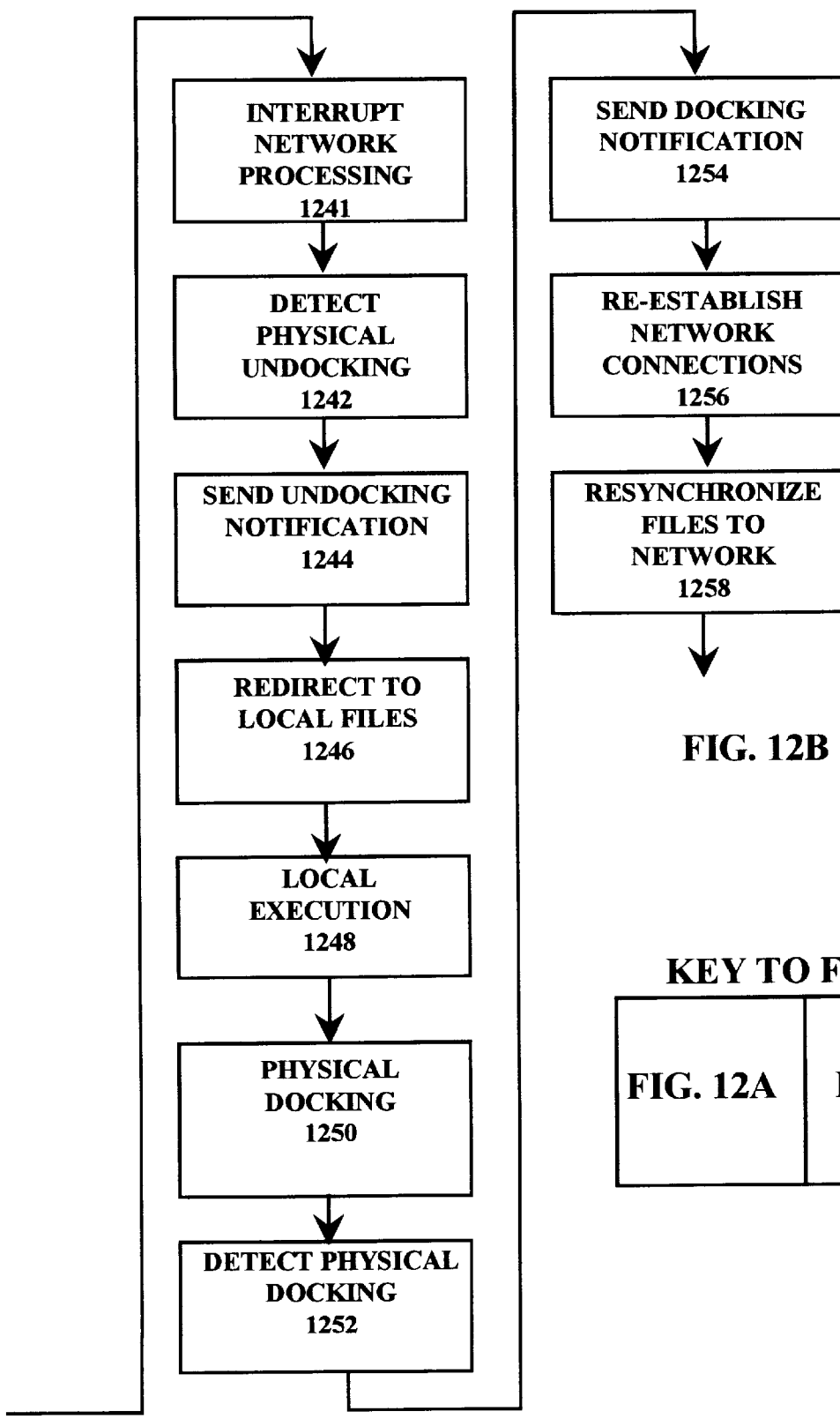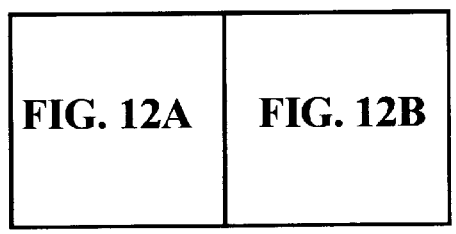

DYNAMIC SYSTEM CONTROL VIA MESSAGING IN A NETWORK MANAGEMENT SYSTEM

BACKGROUND OF THE INVENTION

1. Field of the Invention

The present invention relates to network management systems. More specifically, the present invention relates to a system and method for performing dynamic system control of devices in a network.

2. Description of the Related Art

A network management system performs a highly valuable function of automatically monitoring the operations of a network including monitoring of performance, monitoring of operating characteristics of network equipment such as occurrences of failures, and monitoring of traffic levels on the network. Many proprietary network systems have been made available including Hewlett-Packard's Openview, IBM's Netview, Cabletron's Spectrum, Sun Microsystem's NetManager, and Tandem's Distributed Systems Management (DSM). Digital Equipment Corporation (DEC) has developed both an Enterprise Management Architecture (EMA) and a Digital Network Architecture (DNA). Most recently, network management systems have evolved toward distributed processing environments.

Network management systems, particularly distributed systems, must communicate to monitor and control the network. Several network communication protocols have been developed to supply communication capabilities. One protocol is a simple network management protocol (SNMP) which is developed for usage in a TCP/IP (Transmission Control Protocol/Internet Protocol) community. Another protocol is a common management information protocol (CMIP) which is developed for usage in an ISO/OSI (International Standards Organization/Open Systems Interconnection) community.

One problem with network management systems is that various devices connected on a network communicate using different message formats so that intercommunication between devices is difficult or impossible. Conventionally proprietary protocols, proprietary applications, and custom interfaces have been developed to allow networks to read and understand particular message formats. The failure to provide consistent communications for messages has led to a difficulty in implementing any type of universal system administration or network administration and even less support for particular applications and critical system elements.

System and network administration systems generally require a substantial amount of programming support. In many organizations, programming resources are not abundant. What is needed is a network administration system that facilitates system control operations and supports powerful system control functions.

SUMMARY OF THE INVENTION

In accordance with an embodiment of the present invention, a transactional event management structure is implemented in a network computer system. A dynamic system controller resolves proprietary and standard event and message structures into a common format for use by a system for many management purposes.

In accordance with various embodiments of the present invention, a dynamic system controller in a computer is connected with a plurality of subsystems in the computer for receiving messages from the subsystems, analyzing the messages and determine an effective utilization of the messages as directed by a user or network administrator. The dynamic system controller receives messages in different message formats, organizes the messages, and converts the messages into a common format that assists a user, system administrator, or network administrator in utilizing the information contained in the messages. The converted messages in a common format are distributed at the discretion of a user, network administrator, or system administrator based on user needs or message importance to other system administration applications via a selected communication method. The network administrator controls the type of messages that are communicated over the network.

In accordance with various embodiments of the present invention, a dynamic system controller supports the conversion of messages into the common format to facilitate particular control applications. In one example, the conversion of message to a common format facilitates sophisticated power management operations. Power management is a fundamental operation of common operating systems such as Windows 95, Windows NT, and other operating systems. The power management operations facilitated by the conversion of messages to a common format enable portable and laptop computers to manage power consumption based on user demand rather than system timing.

In accordance with various embodiments of the present invention, a dynamic system controller controls and manages the utilization of messages in desktop, portable and server computer systems.

Many advantages are achieved by the described dynamic messaging control system and operating method. It is highly advantageous to provide a message storage or repository holding messages in a common message format for many purposes. The dynamic messaging control system and operating method includes a message filtering feature that is highly advantageous for substantially reducing the amount of data that is transferred in the limited bandwidth of a network. In a power management application for portable computers, control operations are performed based on the actual dynamic power needs of a system to advantageously extend battery life. In a docking control application, event information is used to coordinate docking of a portable computer to a network, advantageously allowing usage of a system bootstrap operation that returns a user to the most recent point in a running computer program upon connection to the network.

In a supervisory application, a supervisor subsystem granted access to a message repository reads data in the message repository to determine what operations are performed by other subsystems, the resources used by the supervised subsystem and, based on messages arising from system events, advantageously directing the operation of the supervised subsystem.

BRIEF DESCRIPTION OF THE DRAWINGS

The features of the described embodiments believed to be novel are specifically set forth in the appended claims. However, embodiments of the invention relating to both structure and method of operation, may best be understood by referring to the following description and accompanying drawings. The use of the same reference symbols in different drawings indicates similar or identical items.

FIGS. 12A and 12B are flow charts illustrating another specific example of an application, in particular a device-docking application, that exploits common-format messages.

DESCRIPTION OF THE ILLUSTRATIVE EMBODIMENT(S)

Figure 1:
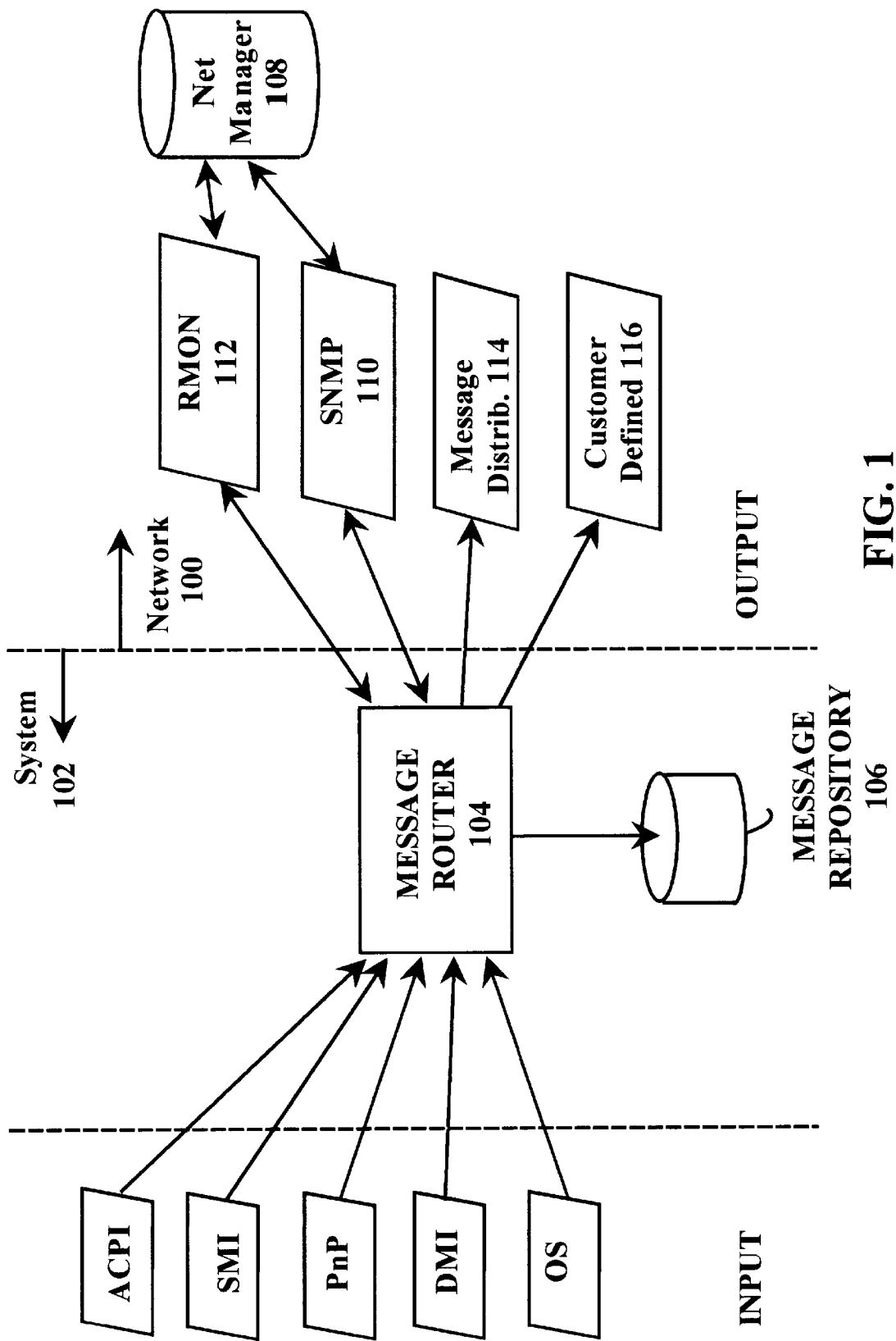
FIG. 1 is a schematic block diagram illustrating an embodiment of a transactional event management structure for accessing messages in different message formats that exist in a network system.

Referring to FIG. 1, a schematic block diagram illustrates an embodiment of a transactional event management structure 100 for accessing messages in different message formats that exist in a network system 102. A message router 104 receives the messages in different message formats and converts the messages in different formats into a common event structure for usage by the network system 102 for system management and network management purposes. The message router 104 is connected to a message repository 106 to store the converted-format messages. In the illustrative embodiment, the message repository 106 is a storage or memory, such as a RAM memory or a form of magnetic storage or disk storage that stores information in a binary format. In some embodiments, a compression technique is applied to generate compressed common format data in the message repository 106 to conserve storage resources.

The transactional event management structure 100 illustrates a flow of message formats for making common-format messages available for usage by various applications in the network system 102. The transactional event management structure 100 includes a network management system 108 made up of a plurality of systems including, for example, a Simple Network Management Protocol (SNMP) system 110, a remote monitoring (RMON) system 112, and a message distribution system 114. In the illustrative embodiment, a customer-defined system 116 is also implemented.

One example of a common message format is a Simple Network Management Protocol (SNMP) format. The network system 102 includes a plurality of subsystems that generate messages in different formats, for example including messages in ACPI (Advanced Configuration and Power Interface), SMI (System Management Interface), PnP (Plug and Play), DMI (Desktop Management Interface), and OS (Operating System) formats.

Advanced Configuration and Power Interface (ACPI) is a specification for controlling power to a device connected to a bus in a PC. The ACPI specification defines various operational power states of devices and specifies a software method for controlling power to the device.

The System Management Interface (SMI) is a standard method for managing various hardware components in a processor such as a personal computer (PC). Hardware components of a PC typically support the SMI for interfacing to a standard Basic Input Output System (BIOS). SMI supports a defined message format that is accessible for determining the operations of the personal computer and devices communicating with the computer.

Desktop Management Interface (DMI) is a management method using a Management Information File (MIF) to describe devices in a system. An applet is defined in the system for accessing the MIF to obtain the detailed information about a device installed in the system. Devices include typical network devices such as control and display devices such as terminals, node, workstations, and computers, and interface devices such as modems. An installed device is "queried" through a service layer and a component interface of the DMI. The DMI defines a message format that is useful for gaining information relating to capabilities of the installed device.

The Operating Systems (OS) use various message formats to communicate with multiple operating system components. The OS uses predefined messages that are accessed during transmission or storage to determine operations that are performed by the system.

The remote monitoring (RMON) system 112 generally includes a plurality of remote management devices (not shown), which are also called probes, distributed geographically and logically to remote segments of a network. The probes are remote sensors of network management for sensing monitored data and sending the sensed data to a centralized management station. The remote monitoring (RMON) system 112 includes a RMON Management Information Base (MIB) (not shown) which standardizes the management information transmitted among the probes. Examples of a RMON MIB are information groups including an "alarm" group and a "capture" group. The alarm group generates an alarm signal when a statistical sample exceeds a preset minimum value. The capture group allows information packets to be captured after passing through a logical channel.

The message repository 106 stores messages in a common format for usage by various subsystems within the network system 102. A subsystem having authorized access to the message repository 106 can advantageously access the message repository 106 for many purposes.

The common message format is useful for many purposes determined by the application utilizing the messages. In one application called a power management application for portable computers, control operations are performed based on the actual dynamic power needs of a system, advantageously extending battery life. In conventional power management applications, power management based on timers is very inefficient for conserving power. The power management application monitors messages communicated in a computer system and analyzes the messages to determine which subsystems within the computer system are idle during the execution of imminent operations. The power management application deactivates subsystems based on the analysis with a user-selected level of aggressiveness.

In another application called a docking control application, event information is used to coordinate docking of a portable computer to a network, allowing usage of a system bootstrap operation that returns a user to the most recent point in a running computer program upon connection to the network. Furthermore, a network administrator can select significant events from messages communicating on the network, intercept the significant events, and send acknowledgment of the occurrence of significant events to a selected management console in the network.

In a further additional application called a supervisory application, a supervisor subsystem granted access to the message repository 106 reads data in the message repository 106 to determine what operations are performed by other subsystems. The supervisory application reads the database of the message repository 106 to determine the application executing on a supervised subsystem, the resources used by the supervised subsystem and, based on messages arising from system events, directing the operation of the supervised subsystem.

Figure 8:
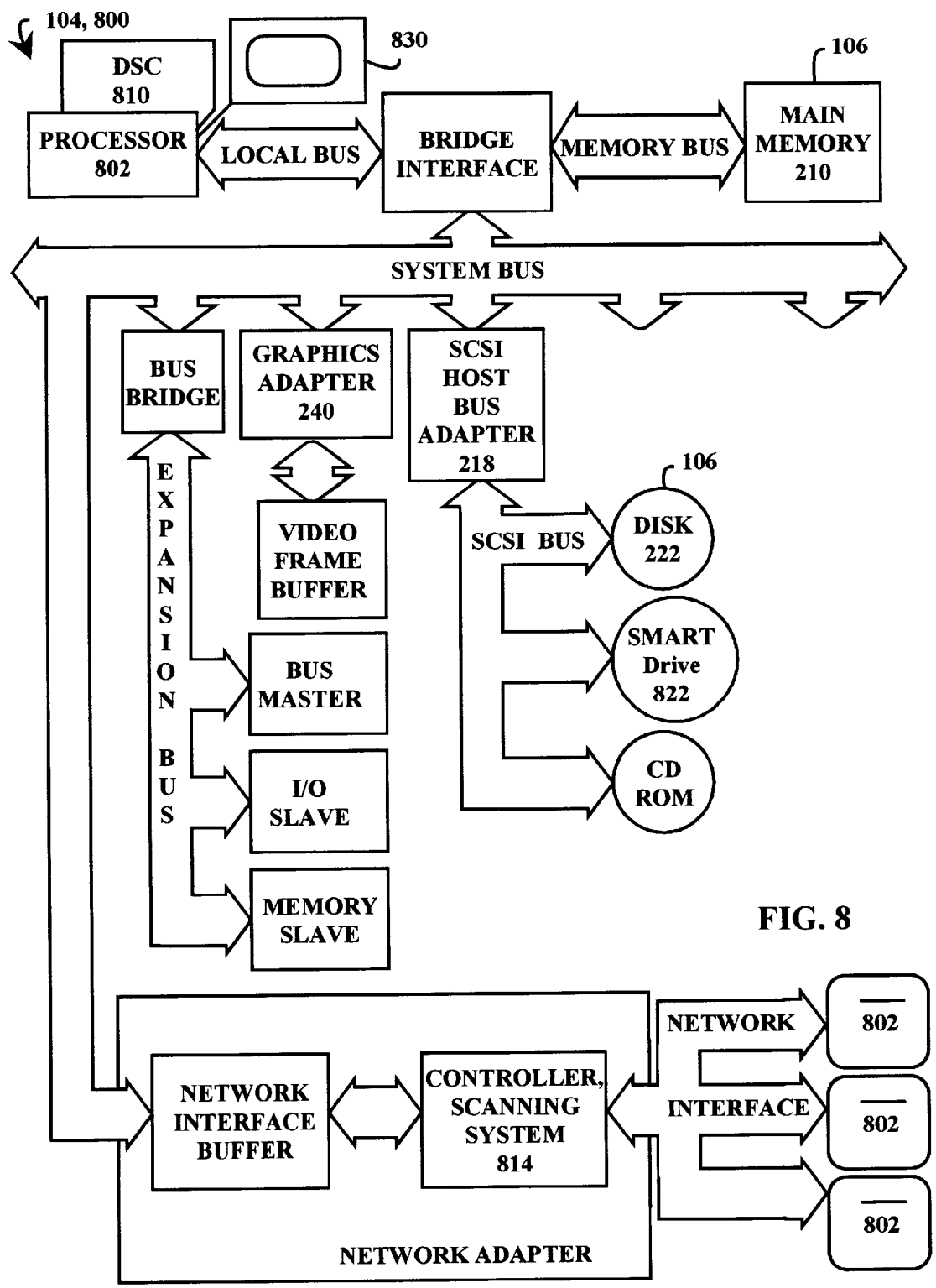
FIG. 8 is a block diagram showing a message router which is implemented as a software program called a dynamic system controller executing on a processor in a computer system.

In further application, which is considered in more detail in the discussion of FIG. 8, a computer system receives notification via a network from a self-diagnostic disk drive indicating that the disk drive is in a critical failure state. The computer system analyzes the notification and determines that a suitable response is the invocation of an alarm message on a display screen.

In a highly specific example of operations, the supervisory application accesses the message repository 106 and determines, for example, that the supervised application is executing a spreadsheet program, has finished loading an executable (.exe) file from hard disk, and is using four megabytes of RAM memory. By monitoring the messages stored in the message repository 106, the supervisory application determines that the supervised spreadsheet application is currently updating cells in the spreadsheet so that current operations are limited to output writes to a display, input reads from a keyboard or mouse, and load and store operations of RAM memory. No magnetic disk accesses are performed. Memory accesses are limited to particular addresses. All subsystems on an external bus are idle. Accordingly, the supervisory application can advantageously conserve power consumption by deactivating the disk drive, deactivating selected banks of RAM memory, and deactivating the external bus and all devices attached to the external bus. The state of the devices is stored so that a resource is rapidly activated when needed by an executing application.

Figure 2:
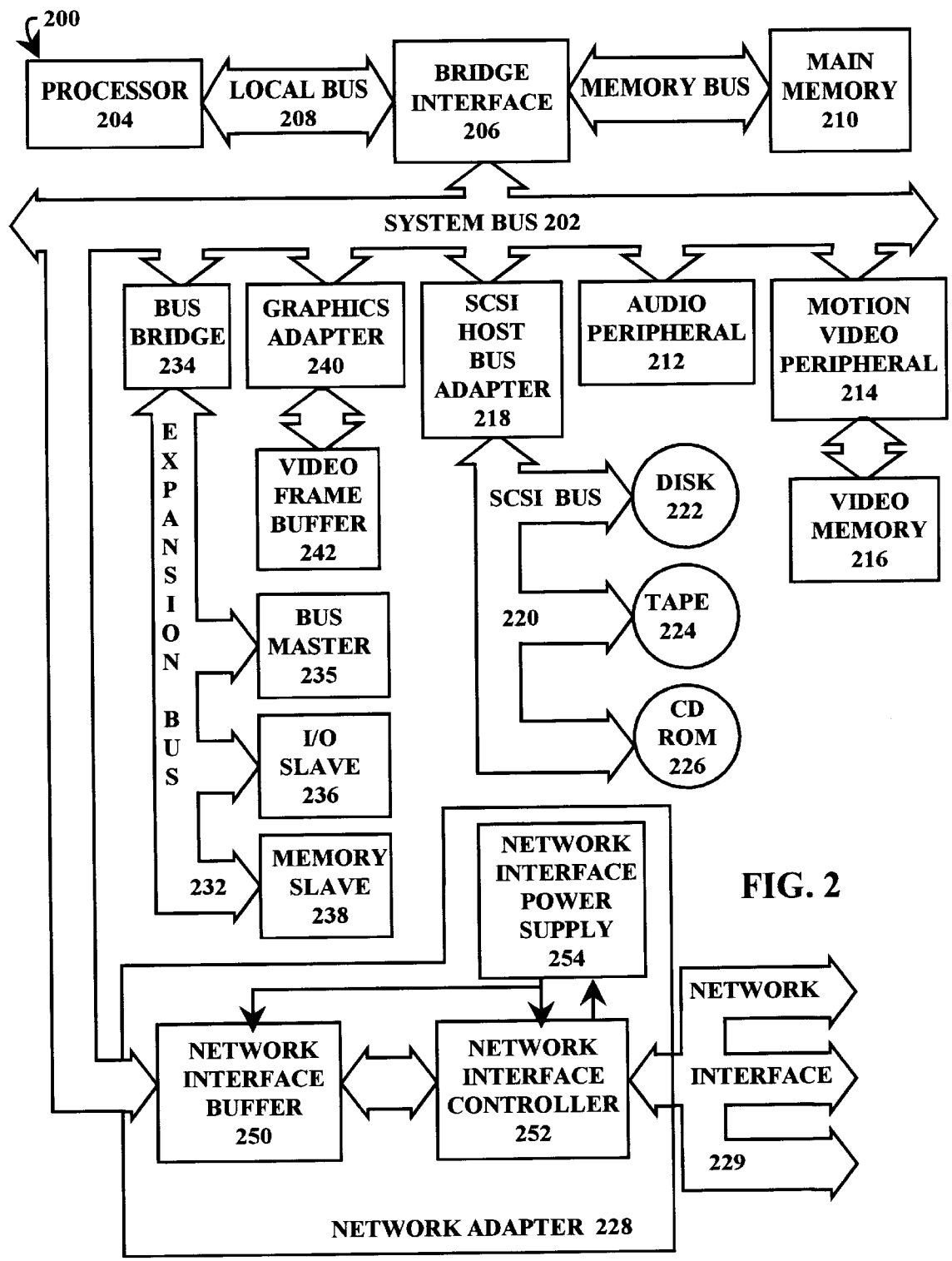
FIG. 2 is a schematic block diagram illustrating an embodiment of a device computer for implementing a dynamic network management control operation.

Referring to FIG. 2, a schematic block diagram illustrates an embodiment of a device computer 200 for implementing a dynamic network management control operation. The device computer 200 includes a system bus 202 for communicating among several devices. A suitable system bus 202 is a Peripheral Component Interconnect (PCI) bus although other bus systems may alternatively be used. A processor 204 is connected to the system bus 202 through a bridge interface 206, which is has a direct connection to the processor 204 via a local bus 208. The bridge interface 206 includes interfacing logic and a cache memory. A main memory 210 supplies storage for data structures and program code for execution by the processor 204 and communicates with the processor 204 via the bridge interface 206 with the cache memory internal to the bridge interface 206 providing caching between the processor 204 and the main memory 210.

Various combinations of devices may be connected to the system bus 202 for interaction with the processor 204. In the illustrative embodiment, devices connected to the system bus 202 include an audio peripheral 212 and a motion video peripheral 214. The motion video peripheral 214 is further connected to a video memory 216.

In the illustrative embodiment, a Small Computer Systems Interface (SCSI) host bus adapter 218 is included to connect the system bus 202 to a SCSI bus 220. The SCSI bus 220 is supplied for connection to devices such as storage devices including a disk storage 222, a tape storage 224, and a CD ROM storage 226. In other embodiments, various alternative interfaces may be substituted for the SCSI bus 220 such as an Enhanced Small Disk Interface (ESDI) or Intelligent Drive Electronics (EDI).

To supply a networking functionality, a network adapter 228 is connected to the system bus 202 for connecting the illustrative device computer 200 to a network 230 such as a local area network (LAN), wide area network (WAN), Internet, intranet, or the like. The dynamic network management control operation performed by software executing in the processor 204 performs control operations either on the local device computer 200 in a standalone control mode or throughout the network 230 via the network adapter 228 in a network control mode of operation.

The network adapter 228 forms a network interface for communicating with other devices connected to the network 230 for implementing a transactional event management structure in a network computer system. The device computer 200 serves as a dynamic system controller for resolving proprietary and standard event and message structures into a common format for use by a system for many management purposes. The dynamic system controller of the device computer 200 is connected with a plurality of subsystems in the network for receiving messages from the subsystems, analyzing the messages and determine an effective utilization of the messages as directed by a user or network administrator. The dynamic system controller of the device computer 200 receives messages in different message formats, organizes the messages, and converts the messages into a common format that assists a user, system administrator, or network administrator in utilizing the information contained in the messages. The converted messages in a common format are distributed at the discretion of a user, network administrator, or system administrator based on user needs or message importance to other system administration applications via a selected communication method. The network administrator controls the type of messages that are communicated over the network. A dynamic system controller supports the conversion of messages into the common format to facilitate particular control applications.

The system bus 202 is connected to an expansion bus 232 by a bus bridge 234. In one example of a device computer 200, the expansion bus 232 is an Industry Standard Architecture (ISA) bus and the bus bridge 234 is a serial input/output (SIO) PCI/ISA bridge. In other embodiments, an expansion bus 232 may be omitted or replaced by other known buses including EISA, microchannel, or other bus. The expansion bus 232 is typically used to connect additional devices to the device computer 200. In the illustrative example, a bus master 235 and several slave devices such as an input/output slave 236 and a memory slave 238 are connected to the expansion bus 232.

A graphics adapter 240 is connected to the system bus 202 for supplying graphics capabilities to the device computer 200. The graphics adapter 240 is connected to a video frame buffer 242.

In the illustrative device computer 200, messages are generated and consumed by a wide variety of subsystems performed a wide array of functions including sound processing and performance, video conferencing, high end graphics, high-speed networking, and many other applications including highly complex analysis and control applications.

The various subsystems within the device computer 200 perform multiple different functions and generate messages that are communicated among subsystems in the device computer 200. This transmission of messages is used to control the system using a network management protocol. In an illustrative embodiment, a Simple Network Management Protocol (SNMP) is used to control subsystems in the device computer 200.

Figure 3:
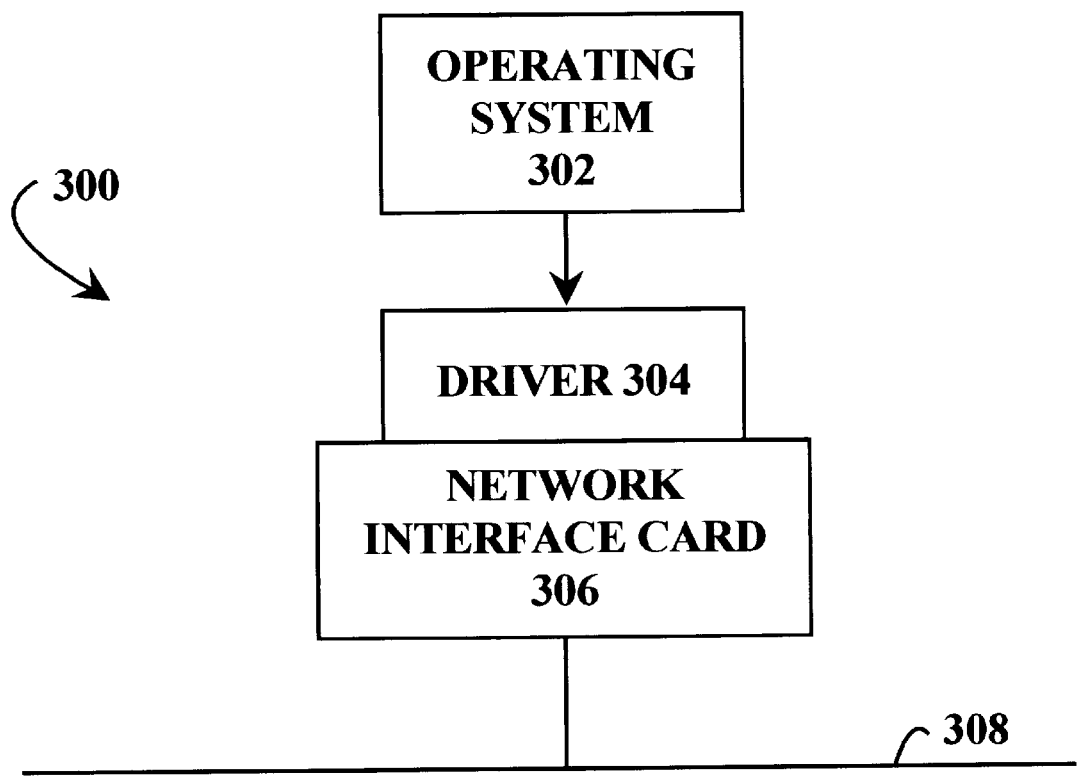
FIG. 3 is a schematic block diagram illustrating an embodiment of a software and network architecture of a network interface controller.

Referring to FIG. 3, a schematic block diagram illustrates an embodiment of a software and network architecture of a network interface controller 300. The network interface controller 300 includes an operating system 302, a driver 304 which is part of the operating system 302, a network interface card 306, and a network wire 308 such as a physical wire in an Ethernet. The network interface card 306 interfaces to the network wire 308 to receive and transmit information. The network interface card 306 is controlled by the operations of the driver 304. The illustrative control program for controlling access of network communications to a receiving device is located in the driver 304.

Figure 4:
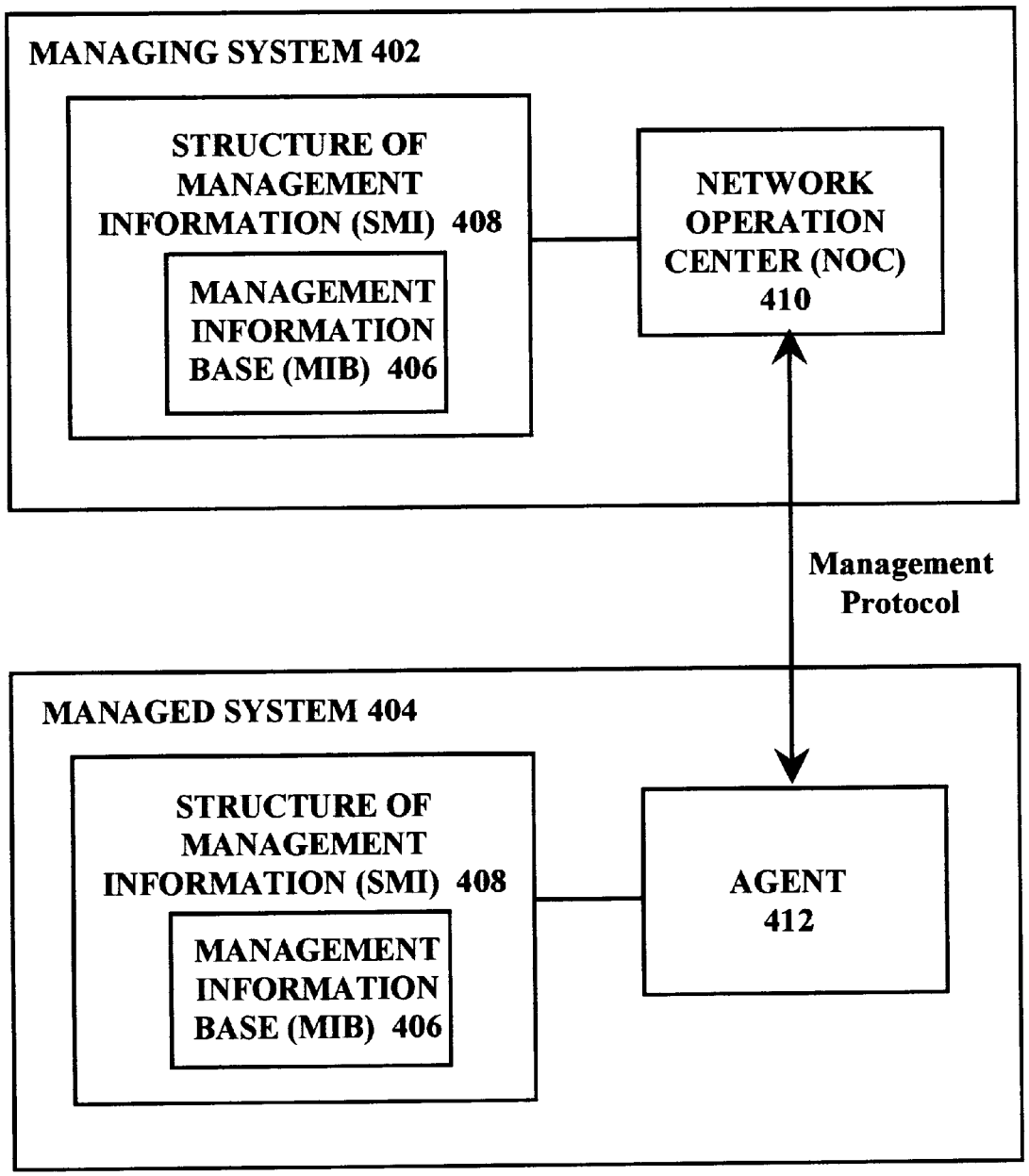
FIG. 4 is a block diagram showing a Simple Network Management Protocol (SNMP) architecture.

Referring to FIG. 4, a block diagram shows a Simple Network Management Protocol (SNMP) architecture 400. The SNMP 400 includes a managing system 402 and a managed system 404. The SNMP 400 is used by devices on a network for relaying network management information to centralized management consoles. The centralized management consoles are generally designed to supply a comprehensive operational view of the network. The SNMP protocol has three components including the management protocol, a management information base (MIB) 406 and a structure of management information 408. Both the managing system 402 and the managed system 404 include the MIB 406 and the structure of management information 408. The SNMP 400 functions in accordance with a client-server model in which the client executes in the managing system 402 and the server executes in the managed system 404. The client in the managing system 402 makes requests and is called a network operation center (NOC) 410. The server in the managed system 404 executes requests and is called an agent 412.

The management information base (MIB) 406 is a repository used by the SNMP 400 to store information relating to devices managed by the SNMP. The SNMP structure of management information 408 uses a subset of an Abstract Syntax Notation One (ASN.1) specification language that the International Standards Organization (ISO) developed for communications above an OSI presentation layer. In one example, a layer 7 defined by the ISO may use ASN. 1 standards so that SNMP is aligned with the OSI environment. MIB objects are organized into a transactional organization.

The management information base (MIB) 406 is a set of managed objects or variables that can be managed. Each data element, such as a node table, is modeled as an object identified by a unique name and management identifier. The complete identification of a managed object includes a name, a syntax identifier, definitions, and an access method such as read-write or read-only access. The access method is defined to protect sensitive data and status information from disclosure. A particular status may be either "required" or "optional" according to the SNMP 400 formulating committee to allow but not require support for optional variables.

Figure 5:
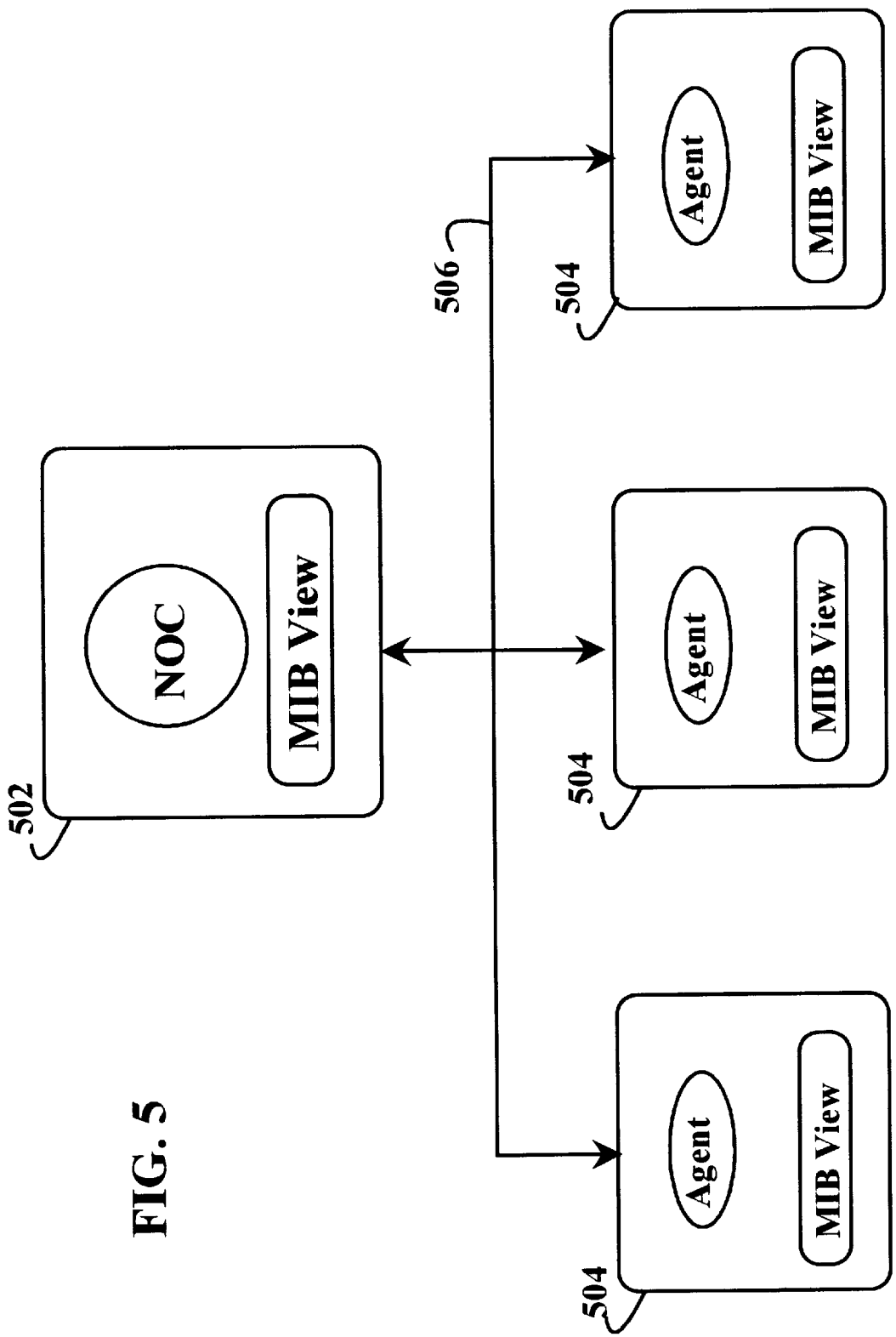
FIG. 5 is a block diagram illustrating an SNMP architecture which most effectively performs communication between one or a small number of supervisory consoles and a large number of remote agents dispersed throughout a network.

Referring to FIG. 5, an SNMP architecture 500 most effectively performs communication between one or a small number of supervisory consoles 502 and a large number of remote agents 504 dispersed throughout a network 506. The remote agents 504 use the MIB 406 for granting the supervisory console 502 access to local data. In this manner, the local data is subject to manipulation by the supervisory console 502. The supervisory console 502 sends get and set requests to remote agents 504. The remote agents 504 initiate traps to the supervisory console 502 upon the occurrence of predetermined trap events. The supervisory console 502 formulates and sends requests for local data, then retrieves and analyzes the local data. Local data is typically not transferred unless requested by the supervisory console 502.

Figure 6:
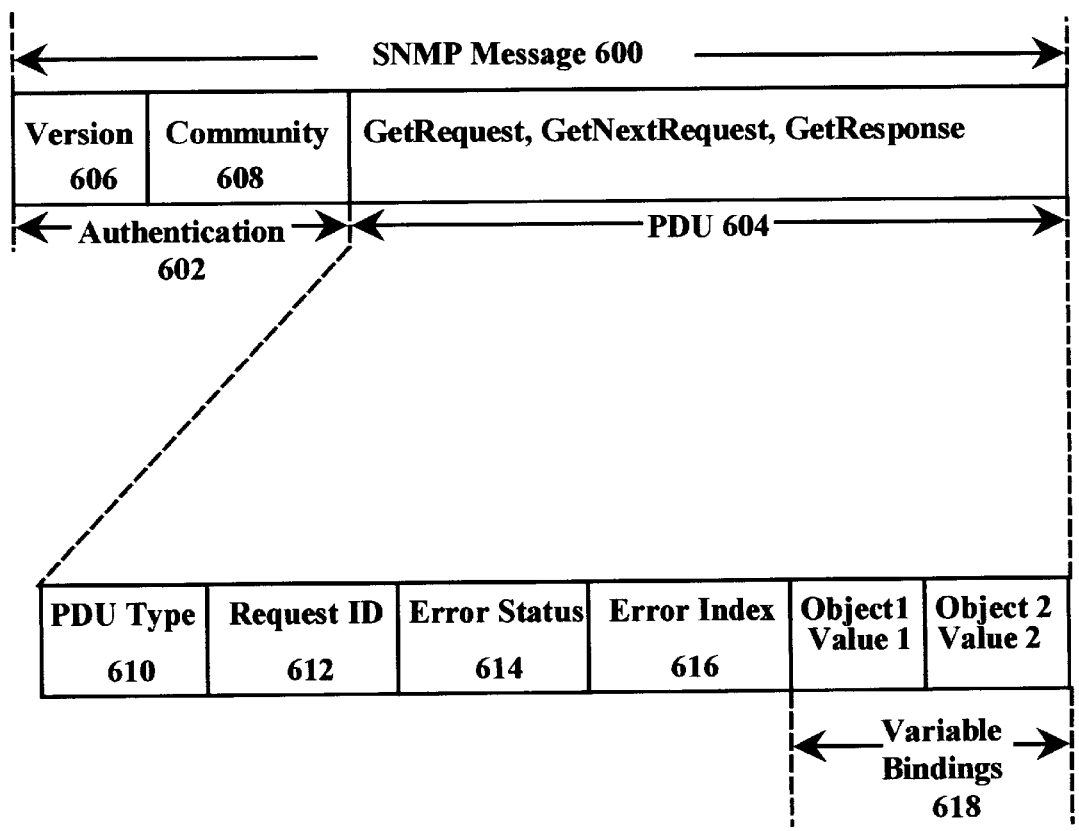
FIG. 6 is a schematic structure showing a general SNMP message format.

Referring to FIG. 6, a schematic structure of a general SNMP message format 600 is shown. The SNMP message format 600 has two sections including an authentication header 602 and a protocol data unit (PDU) 604. The authentication header 602 includes a version identifier 606, and a community name 608. The version identifier 606 is used to coordinate that all parties to a communication transaction use the same version of the SNMP. The PDU 604 includes a PDU type field 610, a request ID field 612, an error status field 614, an error index field 616, and a variable bindings field 618. The PDU type field 610 indicates whether the PDU type is a GetRequest, GetNextRequest, GetResponse, SetRequest, or Trap type. The request ID field 612 correlates a manager request with an agent response. The error status field 614 indicates either normal operation or an error condition. The error conditions include a condition that the response is too large to fit in a single datagram, a condition that a requested object is unknown or unavailable, a condition that an object cannot be set to a specified value, a condition that an object cannot be set, and another unspecified error condition. The error index field 616 is defined during an error condition and identifies the entry within the variable bindings field 618 that caused the error condition. The variable bindings field 618 pairs a variable name with the value of the variable.

Figure 7:
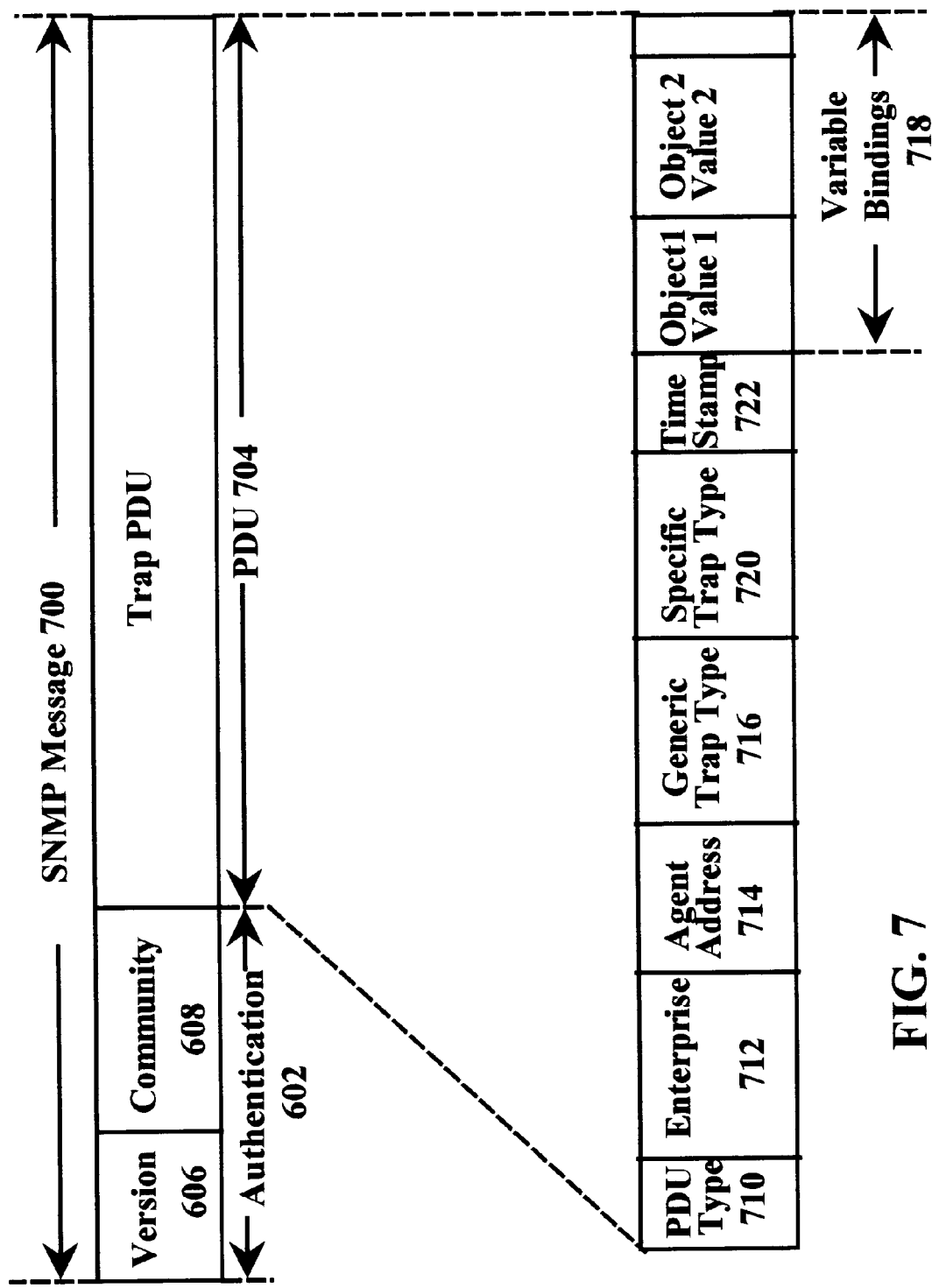
FIG. 7 is a schematic diagram showing a structure of a "trap"-type SNMP message format.

Referring to FIG. 7, a schematic structure of a "trap"-type SNMP message format 700 is shown. A trap is an unsolicited packet sent from an agent to a manager after sensing a prespecified condition such as a cold start, link down, authentication failure, or other event. Like the general SNMP message format 600, the trap-type SNMP message format 700 includes the authentication header 602 with the version identifier 606 and community name 608. However, the trap-type SNMP message format 700 has a protocol data unit (PDU) format 704 that includes the PDU type field 710 and the variable bindings 718 but also includes an enterprise field 712, an agent address 714, a generic trap type 716, a specific trap type 720, and a timestamp 722. The enterprise field 712 identifies the management enterprise in which the registration authority of the trap is defined. The agent address 714 containing the interface protocol (IP) of the agent. The generic trap type 716 identifies a type of trap from among coldStart, warmStart, linkDown, linkUp, authenticationFailure, egpNeighborLoss, enterprise Specific traps. The timestamp 722 contains the value of a sysUpTime object representing the time elapsed between the last reinitialization of the agent and the regeneration of the trap.

Referring to FIG. 8, a block diagram shows a message router 104 which is implemented as a software program called a dynamic system controller 810 executing on a processor 802 in a computer system 800. The message router 104 is connected with a plurality of subsystems 802 in the computer system 800 for receiving messages from a scanning system 814, converting messages to a common format, analyzing the messages, determining an effective utilization of the messages as directed by a user or network administrator, and activating the effective message utilization. Once the messages are converted to the common format, such as the SNMP format, analysis of the messages is simple since all events are tagged by type, subsystem identification and other identifiers. The tagging of messages in this manner allows a subsystem to quickly access precisely-defined events and to filter events that are predefined to be irrelevant to a particular operation.

The message repository 106 is implemented as a cache in the main memory 210 and a file or group of files in the disk storage 222 with the cache being swapped to the disk storage 222 at times determined by the software program. The message repository 106 is cached to increase the throughput of message data, particularly for memory-limited computer systems.

The dynamic system controller 810 receives messages in different message formats and converts the messages into a common format for usage in system management and administration. The converted messages in a common format are distributed at the discretion of a user, network administrator, or system administrator to other system administration applications via a selected communication method. A network administrator operates the dynamic system controller 810 to control the type of messages that are communicated over the network 802.

In one example, the dynamic system controller 810 in the computer system 800 receives a message from a SMART disk drive 822 indicating that the disk drive 822 is in a critical failure state. A SMART disk drive 822 is known in the art of disk drives as a drive including a processor or state machine implementing a self-diagnostic routine for testing the disk drive operation and diagnosing problems including imminent failure. The processor or state machine in the SMART disk drive 822 sends a message over the network 802. The dynamic system controller 810 analyzes the message and determines that an appropriate response is the display of an alert message on a display or console 830 connected to the network 802 to supply notification of the presence of a problem or impending failure. The message advantageously allows maintenance to be performed on the failing SMART disk drive 822 prior to complete failure.

Figure 9:
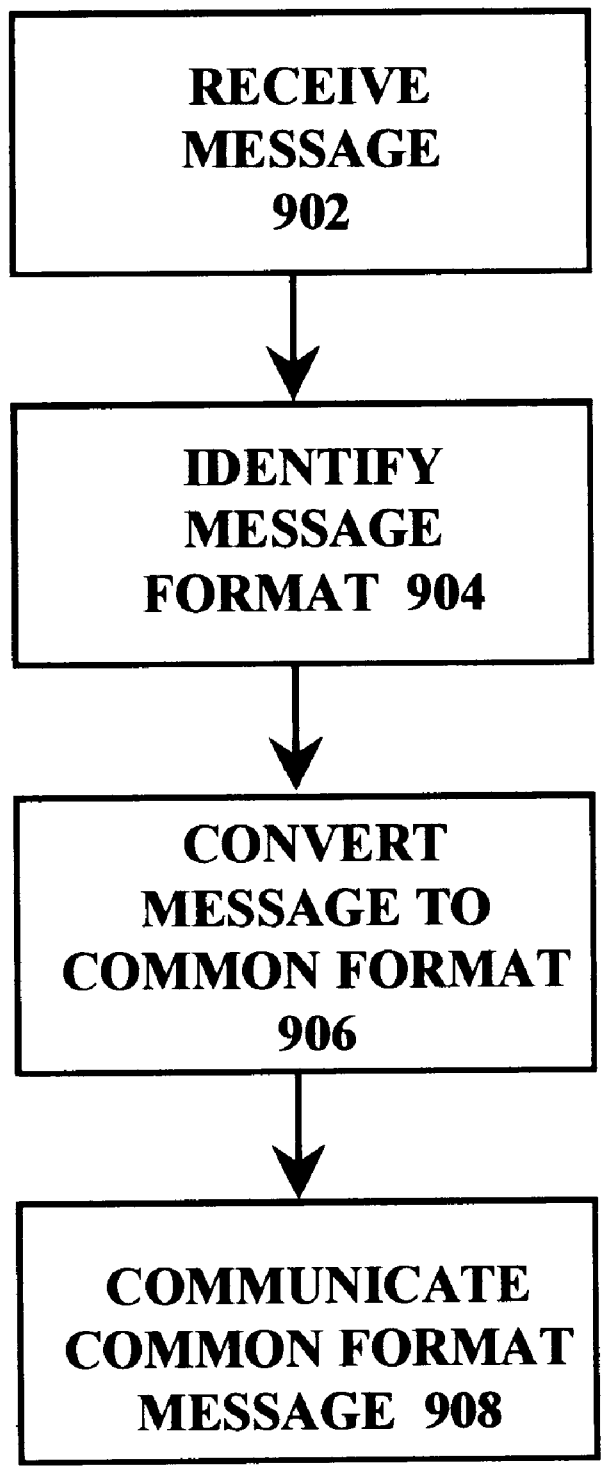
FIG. 9 is a flow chart illustrating operations performed by the dynamic system controller for converting messages to a common format and implementing control operations determined by the converted-format messages.

Referring to FIG. 9, a flow chart illustrates the operations performed by the dynamic system controller 810 for converting messages to a common format and implementing control operations determined by the converted-format messages. In a receive-message step 902, the dynamic system controller 810 receives a message in a particular message format. The dynamic system controller 810 reads and formats messages in all formats and message types that are known to exist is present-day computers, such as personal computers. The dynamic system controller 810 also is expandable to read and format data in formats that are defined in the future since the programming interface is designed to adapt to different message formats. For example, the dynamic system controller 810 is defined to read Desktop Management Interface (DMI), System Management Interface (SMI), Operating Systems (OS), and other message formats.

In an identify message format step 904, the dynamic system controller 810 analyzes the information in the message to determine which format is encoded. The message is parsed and compared to several defined format structures to determine a probable match. Once a suitable format is determined, the message is reformatted according to predetermined rules into a generic or common message format.

In a convert message to common format step 906, the dynamic system controller 810 organizes the significant amount of information that is contained in the message prior to conversion and configures the information into a useful structure. In some embodiments, the dynamic system controller 810 acquires data in a standard form, such as an ASCII code, and compresses and extracts the data into a compact form such as a binary read format.

In communicate common format message step 908, the formatted message is communicated in the network 802 for usage by various devices and systems.

Figure 10:
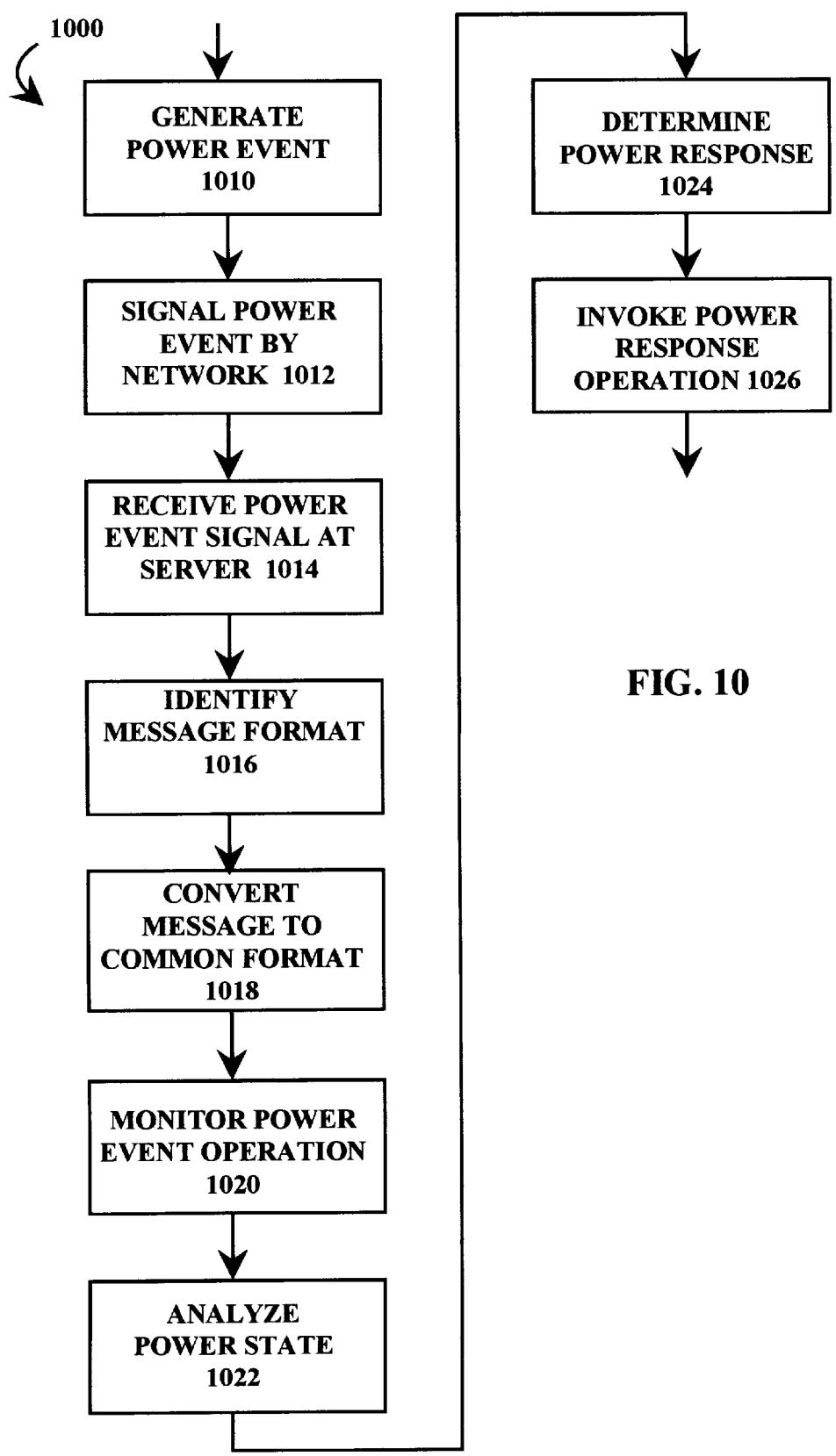
FIG. 10 is a flow chart illustrating a specific example of an application, in particular a power management application, that exploits common-format messages.

Referring to FIG. 10, a flow chart illustrates one specific example of an application, in particular a power management application 1000, that exploits common-format messages. The power management application 1000 enhances battery life by managing power resources based on system usage rather than based on the operation of timers or device drivers in the computer system 800.

In an operation 1010, a power event is generated by a device in a computer system. Power events are generated by various devices that support a power interface such as ACPI, ranging from processors and controllers to many other devices with a wide range of complexity and sophistication. Power events include fixed ACPI events and general-purpose events. Fixed ACPI events include: (1) setting of a carry-bit of a power management timer, (2) actuation of a power button, (3) actuation of a sleep button, (4) a realtime clock (RTC) alarm wakeup, (5) setting of a wake status bit, (6) receipt of a system bus master request, and (7) raising of a global release status. General purpose events include various conditions designated to generate an event signal upon occurrence. General purpose events include wake events, a dispatching event for servicing an ACPI-aware device driver, and a queuing event for determining a control method to queue for execution. The device generating the power event signals the event 1012 via a network link to a server. ACPI events are typically signaled by a System Control Interrupt (SCI).

The server receives a message including the power event signal in operation 1014, analyzes the power event signal message to identify the format of encoding of the power event signal message in an Identify Message Format operation 1016, and converts the power event signal message into a common format in a Convert To Common Format operation 1018. The server monitors the common format power event message by classifying the message as a power event message in a Monitor Power Event operation 1020.

A controller in the server analyzes the power state of the devices in the computer system including the device generating the power event signal in operation 1022. The power management application monitors messages communicated in a computer system and analyzes the messages to determine which subsystems within the computer system are idle during the execution of imminent operations. The device power states are states of particular devices. Some devices may be in an "OFF" state even when the system as a whole is in a working state. Generic states of a device include an "OFF" state, a "D2" device state, a "D1" device state, and a "FULLY-ON" device state.

In the "OFF" state, power is fully removed from the device and context is lost when the state is entered so that operating system software reinitializes the device upon power-up.

The "D2" device state is generally expected to save more power and preserver less device context than the "D1" or "FULLY-ON" device states. Buses in the "D2" device state may cause the associated device to lose some context, for example by reducing power on the bus and thereby causing the device to reduce functionality. Specifications of the "D2" device state are defined for a class of devices. Some device classes do not include a "D2" device specification.

The "D1" state generally saves less power and preserves more device context than the "D1" state. Specifications of the "D1" device state are defined for a class of devices. Some device classes do not include a "D1" device specification.

In the "FULLY-ON" state, the device is completely operational, active and responsive. All relevant device context is preserved continuously. The "FULLY-ON" state is assumed to have the highest level of power consumption.

The operation 1022 of analyzing the power state of the devices includes interrogating devices connected via the network, receiving data, and performing an analysis of the power consumption of the devices, and the amount of context that is retained by hardware in the individual devices as compared to the context responsibility of the operating system. The analysis further includes consideration of the latency and overhead imposed by a device driver in changing the state of a device, such as in changing from the "OFF" state to the "FULLY-ON" state.

Based on the power state of devices in the system and the specific power event signal received by the controller, the controller in the server determines a power response in operation 1024. The response is selected from multiple possible responses. For example, the operation 1024 may used time-based scheduling to manage power in a "business-hours" mode and an "off-hours" mode. During business hours, the system may have many devices, including system-critical devices, always in a working state, but placing non-system-critical devices in a low-power state when the devices are not in operation. During off hours, the system places most devices in a sleep state subject to wakeup signals for handling service requests received over a network. The power management application deactivates subsystems based on the analysis with a user-selected level of aggressiveness. In the power management application for portable computers, control operations are performed based on the actual dynamic power needs of a system, advantageously extending battery life. In conventional power management applications, power management based on timers is very inefficient for conserving power.

In an operation 1026, the controller acts on the power event by invoking the power event operation determined by the controller.

Figure 11:
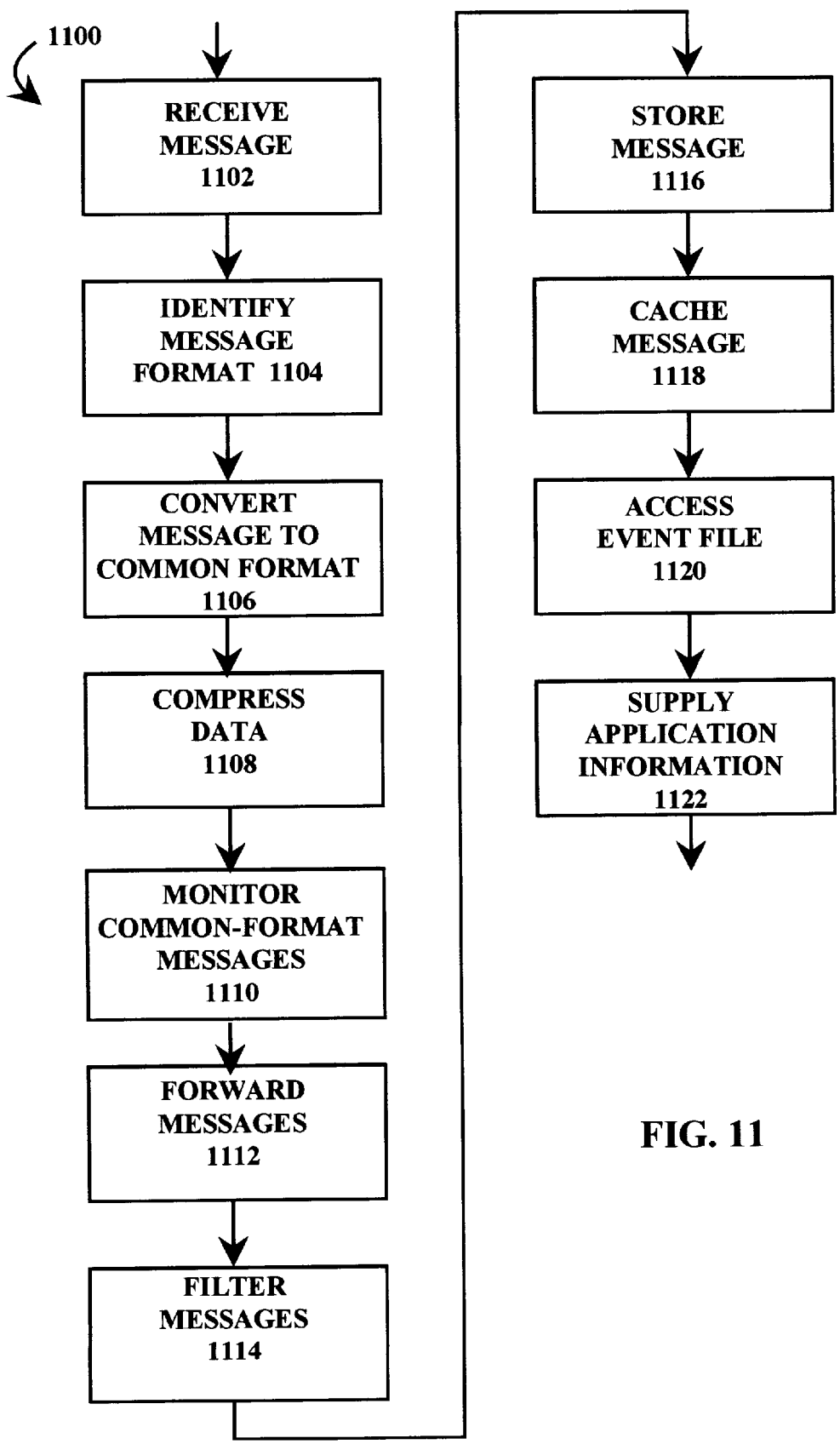
FIG. 11 is a flow chart illustrating another specific example of an application, in particular an event-monitor application, that exploits common-format messages.

Referring to FIG. 11, a flow chart illustrates another specific example of an application, in particular an event-monitor application 1100, that exploits common-format messages. The event-monitor application 1100 is typically a routine or applet operating in conjunction with an operating system such as a Windows NT or Windows 95 operating system which is activated at system bootstrap time to begin actively monitoring events. An applet is an executable program executing on a processor that is intended to browse a network to access one or more remote processors. The event-monitor application 1100 executes in a server which is connected to a network to monitor for all occurrences of particular events that are selected by a user or customer. The selected events are generally any event that the user or customer determines is important for any purpose. The event-monitor application 1100 simply monitors and analyzes messages communicated on the network but generally does not actively perform reactive operations in response to detected events.

The server 810 receives messages in receive-message step 1102, analyzes the information in the message to determine which format is encoded in identify message format step 1104, and converts the messages to a common format in convert-to-common-format step 1106. The server 810 compresses the common format data in a data compression step 1108 to conserve storage resources. Then the server then monitors the common-format messages in monitor step 1110 by comparing a message identifier in the common-format message to a saved important message identifier. In a forward message step 1112, the server forwards a notification of selected events across the network 802 as configured by a user or customer. For example, in some embodiments the event-monitor application 1100 provides for a notification of particular events to be sent over the network 802 to a selected network management system such as Sun Microsystem's NetManager, Hewlett-Packard's Openview, IBM's Netview, or another selected network management system.

Once the message containing the event notification is forwarded across the network 802, the messages are monitored by one or more filters in a message filtering step 1114. In some embodiments, the message filtering step 1114 is performed by a message filtering applet that executes continuously when enabled and monitors the messages written to the event file to detect messages of a predetermined specification. The message filtering step 1114 filters information based on filter specifications set forth by a customer or user. Multiple message filtering applets may be executing at any time. A user generates a particular applet by specifying the characteristics of the messages to be tallied. For example, SNMP messages are specified by a user selecting particular values in information fields including, for example, the PDU type field 610, request ID field 612, error status field 614, error index field 616, and variable bindings field 618. Multiple message filtering applets are run at one time to monitor different events for different purposes or applications.

Message filtering is highly advantageous for substantially reducing the amount of data that is transferred in the limited bandwidth of a network. For many purposes or applications, a single pertinent data sample may be buried in thousands of extraneous messages. By reducing the transferred data to important messages, the speed of communication and efficiency of applications accessing the messages is improved. The message filtering step 1114 advantageously reduces the consumption of disk space as well as conserving network communication bandwidth.

The filtered messages are stored in event files in a store message step 1116. When multiple message filtering applets are executing concurrently, event information is stored in multiple event files, with data extracted by a particular message filter being stored in an event file allocated to receive data from the filter.

A cache message step 1118 is performed so that the most recently stored and most recently accessed messages are made most accessible to applications. For example, in some embodiments a portion of the event information memory is located in high-speed RAM memory while a larger data storage is conserved on a disk drive. Message information is cached in the high-speed RAM so that the most frequently accessed data is quickly accessed without using a disk read operation.

A particular event file is accessed by various application programs as desired. An application reads the information in access event file step 1120. An event that meets the defined filter specification is sent to a selected resource in supply application information step 1122.

Many applications are defined to access the filtered and stored data. Typical applications include event collection, event tabulation and organization, and viewing of event compilations and statistics on a display or in text form. Many applications using a higher level of analysis and control include, for example, operations of: (1) automatic restart of peripheral devices such as remounting of a disk on a server, (2) improved power management in comparison to APM or ACPI standard power management operations, (3) invoking customer control of network management or systems management, (4) improving efficiency of resource utilization for events in comparison to the SNMP, and other applications.

Figure 12A:
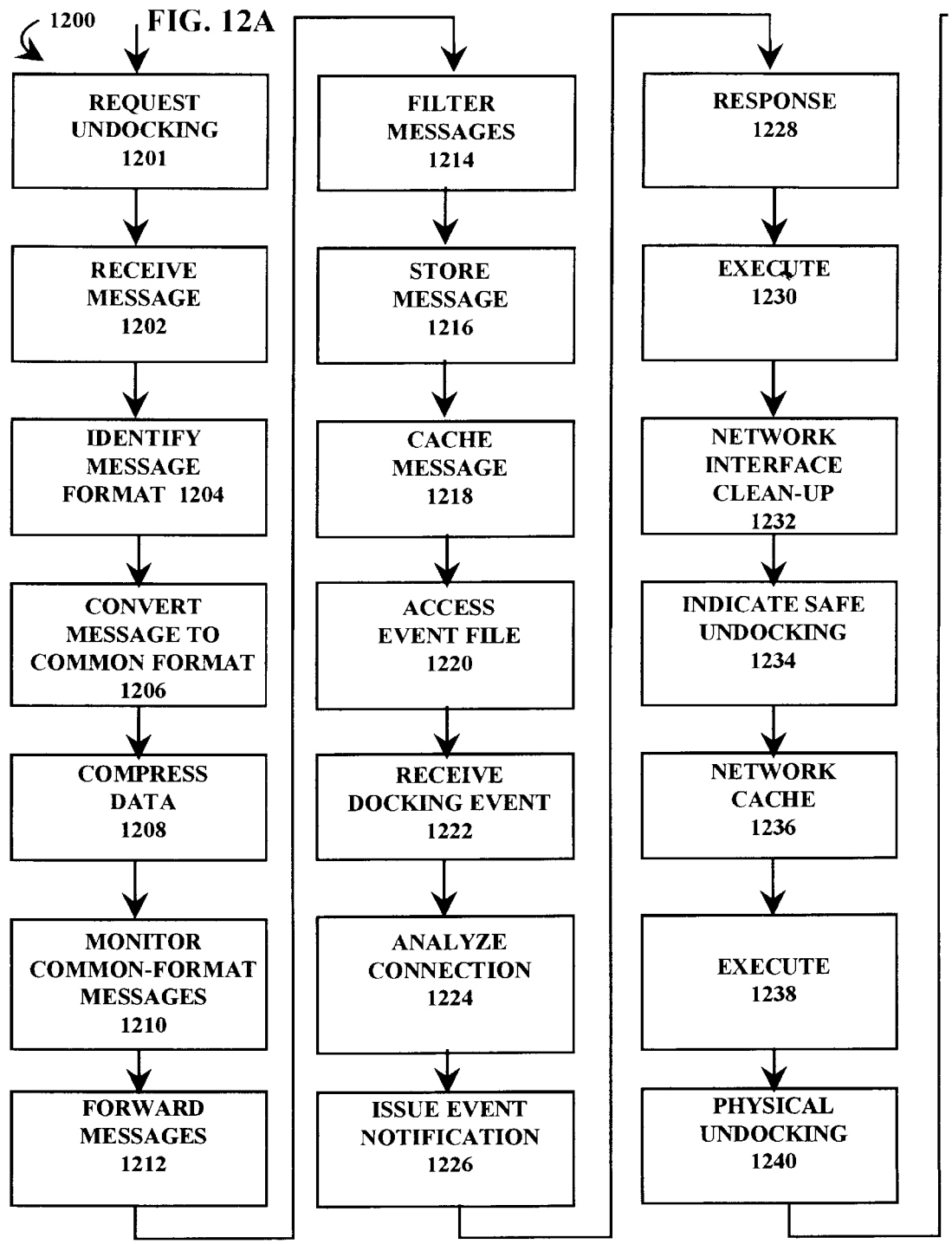

Referring to FIG. 12, a flow chart illustrates another specific example of an application, in particular a device-docking applet 1200, that exploits common-format messages. The device-docking applet 1200 is typically a routine or applet operating in conjunction with an operating system such as a Windows NT or Windows 95 operating system which is activated when a device such as a mobile or portable computer is connected to a network docking station (not shown). In the illustrative embodiment, the device-docking applet 1200 is described as two interdependent applets, one executing on a server and the second executing on the mobile computer that is connected to the server by a docking station. A suitable docking station is formed using a conventional "dumb" docking station and including a network interface, such as the network interface card 306 shown in FIG. 3.

The device-docking applet 1200 responds to events including messages such as a request-to-undock message and physical events such as physical docking and undocking. The device-docking applet 1200 executes in a server which is connected to a network to monitor for all occurrences of docking messages and events. The device-docking applet 1200 monitors and analyzes messages communicated on the network and also actively performs reactive operations in response to detected physical docking and undocking events.

While executing one or more network applications, a user of a mobile computer decides to undock the mobile computer and sends a message via the network link to a server in a Request-Undocking step 1201. The server receives messages in a Receive-Message step 1202, analyzes the information in the message to determine which format is encoded in an Identify-Message-Format step 1204, and converts the messages to a common format in Convert-to-Common-Format step 1206. The server compresses the common format data in a Data-Compression step 1208 to conserve storage resources. Then the server then monitors the common-format messages in a Monitor step 1210 by comparing a message identifier in the common-format message to a saved important message identifier. In a Forward-Message step 1212, the server forwards a notification of selected events across the network as configured by a user or customer. Once the message containing the event notification is forwarded across the network, the messages are monitored by one or more filters in a Message-Filtering step 1214. The Message-Filtering step 1214 is performed by a message filtering applet that executes continuously when enabled and monitors the messages written to the event file to detect messages of a predetermined specification. The filtered messages are stored in event files in a Store-Message step 1216. A Cache-Message step 1218 is performed so that the most recently stored and most recently accessed messages are made most accessible to applications. A particular event file is accessed by various application programs as desired. The device-docking applet 1200 reads the information in Access-Event file step 1220 and determines that the message corresponds to a docking event, in particular an undocking request generated by the mobile computer.

The device-docking applet 1200 receives the event in a Receive-Docking event step 1222 and, in response to the event, analyzes the status of the network interconnection of the mobile computer to the network in an Analyze-Connection step 1224. In the Analyze-Connection step 1224, the device-docking applet 1200 determines the number of network applications that the mobile computer is currently executing, identifies the executing network applications, and the network files that are currently open during execution of the network applications. In an Issue-Notification step 1226 the device-docking applet 1200 sends a notification to the mobile computer identifying the currently executing applications and the open files and inquiring whether to exit the applications and close the open files prior to undocking.

In a Response step 1228, the mobile computer affirms or denies the request to exit applications and close files, or the mobile computer fails to answer the query. If the response is denial of the request or a failure to answer, the device-docking applet 1200 continues to execute the applications in an Execute state 1230. If the response affirms the request, the device-docking applet 1200 exits the executing network applications of the mobile computer, closes any open files, and performs a logout operation in a Network-Interface-Clean-Up step 1232. In an Indicate-Safe-Undocking step 1234, the device-docking applet 1200 sends a message to the mobile computer that conditions are safe for undocking of the computer.

During the Execute state 1230, the mobile computer executes the network applications and the device-docking applet 1200. The device-docking applet 1200 performs a Network-Cache operation 1236 by caching messages and data transferred between the network and the mobile computer in a local storage of the mobile computer.

During the Execute state 1238, the mobile computer may become physically removed or undocked from the docking station. The event of a Physical-Undocking operation 1240 causes an undocking event signal to be generated by the docking station and sent to the device-docking applet 1200 executing in the server. The device-docking applet 1200 executing in the server exits the executing network applications and closes the open network application files pending reconnection of the mobile computer to the docking station in an Interrupt-Network-Processing step 1241. The disconnection also generates an undocking signal that is detected by the mobile computer in a Detect-Physical-Undocking step 1242. The device-docking applet 1200 executing in the mobile computer sends a notification to the user that the mobile computer is physically undocked in Send-Undocking-Notification step 1244. The device-docking applet 1200 then reconfigures File Access Table (FAT) pointers in a Redirect-to-Local-Files step 1246. While executing network applications, the FAT pointers point to files in the network storage, typically in server storage. When the mobile computer is undocked, files in the network storage are no longer accessible so the Redirect-to-Local-Files step 1246 converts the FAT pointers to point to local mobile computer files. The Redirect-to-Local-Files step 1246 step occurs in a manner that is transparent to the user of the mobile computer and emulating network transactions so that an undocking event does not disrupt processing by the mobile computer. In a Local-Execution step 1248, executing network applications continue to execute. Open network files revert to local updating.

The event of a Physical-Docking operation 1250 causes a docking event signal to be generated by the mobile computer that is detected by the mobile computer in a Detect-Physical-Docking step 1252. The device-docking applet 1200 executing in the mobile computer sends a notification to the user that the mobile computer is physically docked in Send-Docking-Notification step 1254. The device-docking applet 1200 sends messages to the server to relog onto the user onto the network in Re-Establish-Network-Connections step 1256. The device-docking applet 1200 then reconfigures File Access Table (FAT) pointers in a Resynchronize-Files-to-Network step 1258, automatically resynchronizing the network applications and the network files. FAT pointers are redirected from the local pointers pointing to storage in the mobile computer to network pointers pointing to storage in the network storage. Like the Redirect-to-Local-Files step 1246 step, the Resynchronize-Files-to-Network step 1258 occurs in a manner that is transparent to the user of the mobile computer so that an docking event does not disrupt processing by the mobile computer. In the illustrative embodiment, the user may selectively resynchronize network applications, restarting selected applications while other, nonselected applications remain dormant. The selective resynchronization feature flexibly allows a user to restart only those applications that are immediately pertinent, advantageously conserving system bandwidth in the network. The network applications continue execution in the Execute state 1238 with executing network applications continuing to execute and network files updating.

The device-docking applet 1200 advantageously allows a device executing in a network to execute network applications either by transnetwork interactions or by standalone control in a manner that is substantially transparent to a user. The user may utilize the mobile computer in a standalone mode, for example while collecting data over time and possibly in several locations. The mobile computer may be connected for a short time, for example at the end of a day, to transfer the collected data over the network.

While the invention has been described with reference to various embodiments, it will be understood that these embodiments are illustrative and that the scope of the invention is not limited to them. Many variations, modifications, additions and improvements of the embodiments described are possible. For example, although the illustrative control system and operating method is described as operating under the Windows 95 and Windows NT operating systems, in other embodiments any suitable operating system supporting network operations may be used. The control system and operating method is intended to be support any suitable network communication protocol.

What is claimed is:

1. A network system comprising:
    a network media for connection to a network device, the network media for transmitting messages in a plurality of message formats;
    a message router coupled to the network media for receiving messages in the plurality of message formats and converting the messages in a plurality of formats into a common message format;
    a message repository coupled to the message router for storing the message in the common message format; and
    an application processor coupled to the message router for receiving a message in the common message format, the application processor for executing an executable supervisory program that manages resource allocation during execution of a supervised application, the supervisory program including:
        a routine that tracks actions performed by the supervised application and resource utilization and nonutilization by the supervised application;
        a routine that tags by message type;
        a routine that filters tagged messages by type so that even irrelevant to the supervised application are filtered; and
        a routine that activates and deactivates resources respectively according to the tracked resource utilization and nonutilization by the supervised application, based on the filtered message to the supervised application.

2. A network system according to claim 1, further comprising:
    a data compressor coupled to the message router that compresses data from the message router and conserves storage resources in the message repository.

3. A network system according to claim 1, wherein:
    the application processor is a power management application processor for executing an executable supervisory program including:
        a routine that monitors messages communicated in a computer system;
        a routine that analyzes the messages to determine which subsystems within the computer system are idle during execution of previously scheduled operations; and
        a routine that deactivates idle subsystems within the computer system.

4. A network system according to claim 1, wherein:
    the application processor is a power management application processor for executing a power management application executable supervisory program including:
        a routine that monitors messages communicated in a network including power event messages;
        a routine that interrogates and analyzes a power state of devices;
        a routine that analyzes the power state of the devices and the power event messages;
        a routine that selects a new power state for the devices in response to the analysis of the power state of the devices and the received power event; and
        a routine that activates and deactivates selected subsystems within the interface based on the analysis.

5. A network system according to claim 1, wherein:
    the application processor is a supervisory application processor for executing a supervisory application executable program including:

a routine that reads data from the message repository;
a routine that analyzes the message repository to determine operations that are currently executing and resources that are used by the executing operations; and
a routine that controls execution of the currently executing programs based on the analysis of the message repository.

6. A network system according to claim 1, wherein:
the message router includes a processor for executing an executable code that converts the messages in a plurality of formats into a common message format that is a simple network management protocol (SNMP) format.

7. A network system according to claim 1, wherein:
the message router includes a processor for executing an executable code that converts the messages in a plurality of formats into a common message format that is a user-defined format.

8. A network system according to claim 1, wherein:
the message router further includes:
a processor;
a message scanner coupled to the processor;
a routing program executable on the processor and including:
a routine that receives a message from the message scanner;
a routine that converts the message to the common message format; and
a routine that analyzes the message.

9. A computer program product for executing in a network system including a network media for connection to a network device and for transmitting messages in a plurality of message formats, a message router coupled to the network media for receiving messages in the plurality of message formats and converting the messages in a plurality of formats into a common message format, a message repository coupled to the message router for storing the message in the common message format; and an application processor coupled to the message router for receiving a message in the common message format, the computer program product comprising:
computer usable medium having computable readable code embodied therein including a power management application executable supervisory program that is executable on the application processor and manages resource allocation during execution of a supervised application, the supervisory program including:
a routine that tracks actions performed by the supervised application and resource utilization and nonutilization by the supervised application; and
a routine that activates and deactivates resources respectively according to the tracked resource utilization and nonutilization by the supervised application;
a routine that monitors messages communicated in a network including power event messages;
a routine that tags messages by message type;
a routine that filters tagged messages by type so that events irrelevant to the supervised application are filtered;
a routine that interrogates and analyzes a power state of devices;
a routine that analyzes the power state of the devices and the power event messages;
a routine that selects a new power state for the devices in response to the analysis of the power state of the devices and the received power event, based on filtered message to the supervised application; and
a routine that activates and deactivates selected subsystems within the interface based on the analysis.

10. A network system according to claim 9, wherein:
the application processor is a docking control application processor for executing a docking control application executable program including:
a routine that receives a message requesting undocking of a computer system connected to the network;
a routine that terminates currently executing network programs and closes open network files in response to the message requesting undocking of the computer system connected to the network;
a routine that detects whether the computer system connected to the network is physically undocked;
a routine that transparently executes network programs locally in the computer system connected to the network and emulates network transactions in response to the detection of the physical undocking of the computer system connected to the network;
a routine that detects whether the computer system connected to the network is physically docked; and
a routine that re-establishes network program connections and restores network files from local files in the computer system connected to the network in response to the detection that the computer system connected to the network is physically docked.

11. A computer program product for executing in a network system including a network media for connection to a network device and for transmitting messages in a plurality of message formats, a message router coupled to the network media for receiving messages in the plurality of message formats and converting the messages in a plurality of formats into a common message format, a message repository coupled to the message router for storing the message in the common message format; and an application processor coupled to the message router for receiving a message in the common message format, the computer program product comprising:
a computer usable medium having computable readable code embodied therein including a power management application executable supervisory program that is executable on the application processor and manages resource allocation during execution of a supervised application, the supervisory program including:
a routine that tracks actions performed by the supervised application and resource utilization and nonutilization by the supervised application; and
a routine that activates and deactivates resources respectively according to the tracked resource utilization and nonutilization by the supervised application;
a routine that receives a message requesting undocking of a computer system connected to the network;
a routine that terminates currently executing network programs and closes open network files in response to the message requesting undocking of the computer system connected to the network;
a routine that detects whether the computer system connected to the network is physically undocked;
a routine that transparently executes network programs locally in the computer system connected to the network and emulates network transactions in response to the detection of the physical undocking of the computer system connected to the network;
a routine that detects whether the computer system connected to the network is physically docked; and a routine that re-establishes network program connections and restores network files from local files in the computer system connected to the network in response to the detection that the computer system connected to the network is physically docked.

12. A computer program product for executing in a network system including a network media for connection to a network device and for transmitting messages in a plurality of message formats, a message router coupled to the network media for receiving messages in the plurality of message formats and converting the messages in a plurality of formats into a common message format, a message repository coupled to the message router for storing the message in the common message format; and an application processor coupled to the message router for receiving a message in the common message format, the computer program product comprising:

a computer usable medium having computable readable code embodied therein including a power management application executable supervisory program that is executable on the application processor and manages resource allocation during execution of a supervised application, the supervisory program including:
  a routine that tracks actions performed by the supervised application and resource utilization and non-utilization by the supervised application; and
  a routine that activates and deactivates resources respectively according to the tracked resource utilization and nonutilization by the supervised application;
  a routine that reads data from the message repository;
  a routine that analyzes the message repository to determine operations that are currently executing and resources that are used by the executing operations;
  a routine that tags messages by message type;
  a routine that filters tagged messages by type so that evens irrelevant to the supervised application are filtered; and
  a routine that controls execution of the currently executing programs based on the analysis of the filtered messages in the message repository.

13. A message router for routing messages in a plurality of message formats from a network device to an application processor, the message router comprising:
  a routine that receives a message from the network device;
  a routine operative in conjunction with the message receiving routine that converts the message to the common message format;
  a routine operative in conjunction with the message converting routine that analyzes the message including determining actions performed and resources utilized and nonutilized in response to receipt of the message;
  a routine that tags messages by message type;
  a routine that filters tagged messages by type so that events irrelevant to the supervised application are filtered; and
  a routine operative in conjunction with the message analyzing routine that controls the application processor based on the filter messages including invoking actions and deactivating non-utilized resources.

14. A message router according to claim 13, further comprising:
  a storage for storing the message in the common message format; and
  a routine that compresses data to conserve storage resources in the data repository.

15. A message router according to claim 13, further comprising:
  a processor;
  a message scanner coupled to the processor;
  a program code executable on the processor and including:
    a routine that receives a message from the message scanner;
    a routine that converts the message to the common message format; and
    a routine that analyzes the message.

16. A message router according to claim 15, further comprising:
  a data repository for storing the message in the common message format; and
  a data compressor coupled to the processor for compressing data to conserve storage resources in the data repository.

17. A message router according to claim 16, wherein:
the data compressor is the processor and a data compressor routine that is executable on the processor.

18. A message router according to claim 17, wherein:
the the data compressor routine further includes:
  a routine operative in conjunction with the converting routine that tags events by type.

19. A message router according to claim 18, wherein:
the program code executable on the processor for includes:
  a routine operative in conjunction with the analyzing routine for filtering tagged events by type to filter out events irrelevant to an application.

20. A message router according to claim 13, wherein:
the program code executable on the processor further includes:
  a routine that monitors messages communicated in a network including power event messages;
  a routine that interrogates and analyzes a power state of devices;
  a routine that analyzes the power state of the devices and the power event messages;
  a routine that selects a new power state for the devices in response to the analysis of the power state of the devices and the received power event; and
  a routine that activates and deactivates selected subsystems within the interface based on the analysis.

21. A message router according to claim 13, wherein:
the program executable on the application processor further includes:
  a routine that receives a message requesting undocking of a computer system connected to the network;
  a routine that terminates currently executing network programs and closes open network files in response to the message requesting undocking of the computer system connected to the network;
  a routine that detects whether the computer system connected to the network is physically undocked;
  a routine that transparently executes network programs locally in the computer system connected to the network and emulates network transactions in response to the detection of the physical undocking of the computer system connected to the network;
  a routine that detects whether the computer system connected to the network is physically docked; and
  a routine that re-establishes network program connections and restores network files from local files in the computer system connected to the network in response to the detection that the computer system connected to the network is physically docked.

22. A message router according to claim 13, wherein:
the program executable on the application processor further includes:
a routine that reads data from the message repository;
a routine that analyzes the message repository to determine operations that are currently executing and resources that are used by the executing operations; and
a routine that controls execution of the currently executing programs based on the analysis of the message repository.

23. A computer program product comprising:
a computer usable medium having computable readable code embodied therein including:
a message router for routing messages in a plurality of message formats from a network device to an application processor, the message router including:
a routine that receives a message from the network device;
a routine operative in conjunction with the message receiving routine that converts the message to the common message format;
a routine operative in conjunction with the message converting routine that analyzes the message including determining actions performed and resources utilized and nonutilized in response to receipt of the message;
a routine that tags messages by message type;
a routine that filters tagged messages by type so that events irrelevant to the supervised application are filtered; and
a routine operative in conjunction with the message analyzing routine that controls the application processor based on the filtered messages including invoking actions and deactivating non-utilized resources.

24. A computer program product comprising:
a computer usable medium having computable readable code embodied therein including:
a programmable routine that routes messages in a plurality of message formats from a network device to an application processor, the message router including:
a routine that receives a message from the network device;
a routine operative in conjunction with the message receiving routine that converts the message to the common message format;
a routine operative in conjunction with the message converting routine that analyzes the message including determining actions performed and resources utilized and nonutilized in response to receipt of the message;
a routine that tags messages by message type:
a routine that filterstagged messages be type so that events irrelevant to the supervised application are filtered; and
a routine operative in conjunction with the message analyzing routine that controls the application processor based on the filtered messages including invoking actions and deactivating non-utilized resources.

25. A computer program product comprising:
a computer usable medium having computable readable code embodied therein including:
a programmable routine that routes messages in a plurality of message formats from a network device to an application processor, the message router including:
a routine that receives a message from the network device;
a routine operative in conjunction with the message receiving routine that converts the message to the common message format;
a routine operative in conjunction with the message converting routine that analyzes the message including determining actions performed and resources utilized and nonutilized in response to receipt of the message;
a routine operative in conjunction with the message analyzing routine that controls the application processor including invoking actions and deactivating non-utilized resources;
a routine that receives a message requesting undocking of a computer system connected to the network;
a routine that terminates currently executing network programs and closes open network files in response to the message requesting undocking of the computer system connected to the network;
a routine that detects whether the computer system connected to the network is physically undocked;
a routine that transparently executes network programs locally in the computer system connected to the network and emulates network transactions in response to the detection of the physical undocking of the computer system connected to the network;
a routine that detects whether the computer system connected to the network is physically docked; and
a routine that re-establishes network program connections and restores network files from local files in the computer system connected to the network in response to the detection that the computer system connected to the network is physically docked.

26. A computer program product comprising:
a computer usable medium having computable readable code embodied therein including:
a programmable routine that routes messages in a plurality of message formats from a network device to an application processor, the message router including:
a routine that receives a message from the network device;
a routine operative in conjunction with the message receiving routine that converts the message to the common message format;
a routine operative in conjunction with the message converting routine that analyzes the message including determining actions performed and resources utilized and nonutilized in response to receipt of the message;
a routine operative in conjunction with the message analyzing routine that controls the application processor including invoking actions and deactivating non-utilized resources;
a routine that reads data from the message repository;
a routine that analyzes the message repository to determine operations that are currently executing and resources that are used by the executing operations;

a routine that tags messages by message type;

a routine that filters tagged messages by type so that events irrelevant to the supervised application are filtered; and a routine that controls execution of the currently executing programs based on the analysis of the message repository.

27. A method of routing messages in a plurality of message formats from a network device to an application processor, the method comprising:

receiving a message from the network device;

converting the received message to the common message format;

analyzing the converted message including:

determining actions performed and resources utilized and nonutilized in response to receipt of the message;

tagging messages by message type;

filtering tagged messages by type so that events irrelevant to a supervised application are filtered; and controlling the application processor based on the analysis of the converted and filtered message including:

invoking actions and deactivating non-utilized resources.

28. A method according to claim 27, further comprising:

tagging event by a type message field within the common message format.

29. A method according to claim 28, further comprising:

filtering events using the event tags;

determining a filtering event classification to filter out events irrelevant to an application.

30. A method according to claim 27, further comprising:

storing the message in the common message format; and compressing data coupled to the storage to conserve storage resources in the data repository.

31. A method according to claim 27, further comprising:

monitoring messages communicated in a network including power event messages;

interrogating and analyzing a power state of devices;

analyzing the power state of the devices and the power event messages;

selecting a new power state for the devices in response to the analysis of the power state of the devices and the received power event; and activating and deactivating selected subsystems within the interface based on the analysis.

32. A method according to claim 27, further comprising:

receiving a message requesting undocking of a computer system connected to the network;

terminating executing network programs and closing open network files in response to the message requesting undocking of the computer system connected to the network;

detecting that the computer system connected to the network is physically undocked;

transparently executing network programs locally in the computer system connected to the network and emulating network transactions in response to the detection of the physical undocking of the computer system connected to the network;

detecting that the computer system connected to the network is physically docked; and re-establishing network program connections and restoring network files from local files in the computer system connected to the network in response to the detection that the computer system connected to the network is physically docked.

33. A method according to claim 27, further comprising:

reading data from the message repository;

analyzing the message repository to determine operations that are currently executing and resources that are used by the executing operations; and controlling execution of the currently executing programs based on the analysis of the message repository.

34. A method of routing messages in a plurality of message formats from a network device to an application processor, the method comprising:

converting messages to a common format;

storing the common format messages in a storage;

accessing the storage to retrieve the common format messages;

analyzing applications executing in the system on the basis of the common format messages in the storage including:

determining actions performed and resources utilized and non-utilized by the applications;

taging messages by message type;

filtering tagged messages by type so that events irrelevant to a supervised application are filtered; and controlling the operation of the applications based on analysis of the filtered common format messages in the storage including:

invoking actions and deactivating non-utilized resources.

35. A network system comprising:

means for connecting to a network device;

means coupled to the connecting means for transmitting messages in a plurality of message formats;

means coupled to the connecting means for receiving messages in the plurality of message formats and converting the messages in a plurality of formats into a common message format;

means coupled to the receiving and converting means for storing the message in the common message format; and an application processing means coupled to the storing means for executing a supervisory means for managing resource allocation during execution of a supervised application, the supervisory means including:

means for tagging messages by message type;

means for filtering tagged messages be type so that events irrelevant to the supervised application are filtered;

means for tracking actions performed by the supervised application and for tracking resource utilization and nonutilization by the supervised application; and means for activating and deactivating resources respectively according to the tracked resource utilization and nonutilization by the supervised application and according to the filtered messages to the supervised application.

36. A message router for routing messages in a plurality of message formats from a network device to an application processor, the message router comprising:

means for receiving a message from the network device;

means operative in conjunction with the message receiving means for converting the message to the common message format;

means operative in conjunction with the message converting means for analyzing the message including:
  means for determining actions performed and resources utilized and nonutilized in response to receipt of the message;
  means for tagging messages by message type;
  means for filtering tagged messages by type so that events irrelevant to the supervised application are filtered; and
means operative in conjunction with the message analyzing means for controlling the application processor based on the filtered messages including:
  means for invoking actions and deactivating non-utilized resources.

37. A message router for routing messages in a plurality of message formats from a network device to an application processor comprising:
  means for converting messages to a common format;
  means for storing the common format messages in a storage;
  means for accessing the storage to retrieve the common format messages;
  means for analyzing applications executing in the system on the basis of the common format messages in the storage including:
    means for tagging messages by message type;
    means for filtering tagged messages by type so that events irrelevant to the supervised application are filtered;
    means for determining actions performed and resources utilized and non-utilized by the applications; and
  means for controlling the operation of the applications based on analysis of the filtered common format messages in the storage including:
    means for involving actions and deactivating non-utilized resources.

38. A message router for routing messages in a plurality of message formats from a network device to an application processor, the method comprising:
  means for receiving a message from the network device;
  means for converting the received message to the common message format;
  means for analyzing the converted message including:
    means for determining actions performed and resources utilized and nonutilized in response to receipt of the message;
    means for tagging messages by message type;
    means for filtering tagged messages by type so that events irrelevant to a supervised application are filtered; and
  means for controlling the application processor based on the analysis of the filtered, converted message including:
    means for invoking actions and deactivating non-utilized resources.

* * * * *